United States Patent [19]

Morikawa et al.

[11] Patent Number: 5,652,300

[45] Date of Patent: *Jul. 29, 1997

[54] SELF-EMULSIFIABLE POLYISOCYANATE MIXTURE AND AQUEOUS COATING OR ADHESIVE COMPOSTION COMPRISING THE MIXTURE

[75] Inventors: Yukihiro Morikawa, Yokohama; Shin Konishi, Fujisawa; Kouichi Uehara, Yokohama, all of Japan

[73] Assignee: Nippon Polyurethane Industry Co., Ltd., Tokyo, Japan

[*] Notice: The term of this patent shall not extend beyond the expiration date of Pat. No. 5,373,050.

[21] Appl. No.: 570,681

[22] Filed: Dec. 11, 1995

[51] Int. Cl.[6] .................................... C08G 18/10
[52] U.S. Cl. ............... 524/591; 252/182.2; 252/182.22; 528/60; 528/65; 528/67; 528/905; 528/76; 524/501; 524/507; 525/127; 525/460
[58] Field of Search .................... 252/182.2, 182.22; 528/60, 65, 67, 905, 76; 524/501, 507, 591; 525/127, 460

[56] References Cited

U.S. PATENT DOCUMENTS

| | | | |
|---|---|---|---|
| 4,663,377 | 5/1987 | Hombach et al. | 524/196 |
| 5,200,489 | 4/1993 | Jacobs et al. | 528/49 |
| 5,252,696 | 10/1993 | Laas et al. | 528/49 |
| 5,373,050 | 12/1994 | Morikawa et al. | 524/591 |

FOREIGN PATENT DOCUMENTS

| | | |
|---|---|---|
| 60-255875 | 12/1985 | Japan . |
| 60-255876 | 12/1985 | Japan . |
| 60-255877 | 12/1985 | Japan . |
| 62-50373 | 3/1987 | Japan . |
| 62-115076 | 5/1987 | Japan . |

Primary Examiner—Rachel Gorr
Attorney, Agent, or Firm—Browdy and Neimark

[57] ABSTRACT

A self-emulsifiable polyisocyanate mixture which is of a non-yellowing type, is not deteriorated in weather resistance, has a high hardness and is quick-drying and which is obtained from a specific, NCO-terminated modified HDI and has introduced thereinto a specific, NCO-terminated modified IPDI or a specific, NCO-terminated modified TDI, and an aqueous coating or adhesive composition comprising the above self-emulsifiable polyisocyanate mixture.

26 Claims, No Drawings

SELF-EMULSIFIABLE POLYISOCYANATE MIXTURE AND AQUEOUS COATING OR ADHESIVE COMPOSTION COMPRISING THE MIXTURE

BACKGROUND OF THE INVENTION

1. Field of the Invention

This invention relates to a self-emulsifiable polyisocyanate mixture obtained from a specific modified hexamethylene diisocyanate (hexamethylene diisocyanate is hereinafter abbreviated as HDI in some cases), a specific modified isophorone diisocyanate (isophorone diisocyanate is hereinafter abbreviated as IPDI in some cases) or a specific modified tolylene diisocyanate (tolylene diisocyanate is hereinafter abbreviated as TDI in some cases); an aqueous coating or adhesive composition comprising the self-emulsifiable polyisocyanate mixture; and an aqueous dispersion comprising the self-emulsifiable polyisocyanate mixture for use as a paint or adhesive.

2. Description of Prior Art

Coating compositions or adhesive compositions containing organic solvents have problems of safety and sanitary such as bad influence upon human body, explosive fire or the like and public pollution such as air pollution or the like, so that a development of aqueous system has recently been actively made. In such an aqueous system, a water-soluble resin or aqueous emulsion has heretofore been used. However, with a one-pack system consisting only of the water-soluble resin or aqueous emulsion, the required physical properties cannot be developed in many cases, and in general, a cross-linking agent is co-used for improving weather resistance, adhesiveness to substrate and the like.

The cross-linking system includes various reactions, and among them, examples using a self-emulsifiable polyisocyanate are stated in Japanese Patent Application Kokai No. 62-50,373 and U.S. Pat. No. 4,663,377. In both cases, a self-emulsifiable polyisocyanate into which a nonionic, hydrophilic surfactant has been incorporated as a cross-linking agent is used.

In particular, it is a known fact that a hydrophilic surfactant-modified, isocyanurate group-containing, self-emulsifiable polyisocyanate is used for the purpose of enhancing the heat resistance, weather resistance and adhesiveness of a water-soluble resin or aqueous emulsion.

However, many conventional self-emulsifiable polyisocyanates which have been used in such fields that a good coating appearance is required such as a paint field and the like are composed only of non-yellowing, isocyanate group-terminated (referred to hereinafter as NCO-terminated in some cases) HDI polymer. This NCO-terminated HDI polymer has a soft skeleton, so that it has such disadvantages that when it is used as a cross-linking agent for the water-soluble resin or aqueous emulsion, the hardness of the resulting coating film is low and the drying rate is small.

Moreover, since the conventional self-emulsifiable polyisocyanate has a hydrophilic surfactant introduced thereinto, it has a great affinity for water, and hence, it is disadvantageous in that the reaction of its isocyanate group with water becomes easier, and hence, the pot life becomes short. Also, the starting HDI is more expensive than TDI or the like which is a yellowing type isocyanate and hence the final product becomes expensive as a matter of course.

The present inventors have made extensive research to solve the above prior art problems and have consequently found that the use of a specific, isocyanate group-terminated modified hexamethylene diisocyanate and a specific, isocyanate group-terminated modified isophorone diisocyanate having at least isocyanurate group and having a hard skeleton and a specific, isocyanate group-terminated modified tolylene diisocyanate having at least isocyanurate group in combination is effective for improving the hardness of coating film and the drying rate.

In this case, the co-use of the isocyanate group-terminated modified isophorone which is low in reactivity with water enables the pot life to be extended and the co-use of the isocyanate group-terminated modified tolylene diisocyanate which is less expensive enables the cost of the final product to be lowered.

SUMMARY OF THE INVENTION

According to this invention, there is provided:

I. a self-emulsifiable polyisocyanate mixture having an average NCO functionality of 2.0 to 4.2 obtained by reacting:

(1) a nonionic hydrophilic surfactant having one or more active hydrogen atoms capable of reacting with isocyanate group (referred to hereinafter as NCO group in some cases) and 3 to 90 alkylene oxide units and (2) an aliphatic compound having one or more active hydrogen atoms capable of reacting with isocyanate group and 8 or more carbon atoms, with an isocyanate mixture consisting of (a) an isocyanate group-terminated modified hexamethylene diisocyanate obtained by subjecting hexamethylene diisocyanate to urethanation with a dihydric alcohol and polymerization and then removing the unreacted hexamethylene diisocyanate monomer therefrom to a content of not more than 1% by weight and (b) an isocyanate group-terminated modified isophorone diisocyanate having at least isocyanurate group from which the unreacted isophorone diisocyanate monomer has been removed to a content of not more than 1% by weight, at a weight ratio of 99:1 to 50:50, wherein the dihydric alcohol is bonded in a proportion of 0.1 to 15% by weight based on the weight of the self-emulsifiable polyisocyanate mixture, the component (1) is bonded in a proportion of 0.1 to 40% by weight based on the weight of the self-emulsifiable polyisocyanate mixture and the component (2) is bonded in a proportion of 0 to 30% by weight based on the weight of the self-emulsifiable polyisocyanate mixture, or II. a self-emulsifiable polyisocyanate mixture having an average NCO functionality of 2.0 to 5.0 obtained by reacting:

(1) a nonionic hydrophilic surfactant having one or more active hydrogen atoms capable of reacting with isocyanate group and 3 to 90 alkylene oxide units and (2) an aliphatic compound having one or more active hydrogen atoms capable of reacting with isocyanate group and 8 or more carbon atoms, with an isocyanate mixture consisting of (a) an isocyanate group-terminated modified hexamethylene diisocyanate obtained by subjecting hexamethylene diisocyanate to urethanation with a dihydric alcohol and polymerization and then removing the unreacted hexamethylene diisocyanate monomer therefrom to a content of not more than 1% by weight and (c) an isocyanate group-terminated modified tolylene diisocyanate having at least isocyanurate group from which the unreacted tolylene diisocyanate monomer has been removed to a content of not more than 1% by weight, at a weight ratio of 99:1 to 70:30, wherein the dihydric alcohol is bonded in a proportion of 0.1 to 15% by weight based on the weight of the self-emulsifiable polyisocyanate mixture, the component (1) is bonded in a proportion of 0.1 to 40% by weight based on the weight of the self-emulsifiable polyisocyanate mixture and the component (2) is bonded in a proportion of 0 to 30% by weight based on the weight of the self-emulsifiable polyisocyanate mixture.

This invention also provides an aqueous coating or adhesive composition comprising the above-mentioned self-emulsifiable polyisocyanate mixture I or II, a water-soluble resin and/or an aqueous emulsion and, if necessary, an additive wherein the content of the self-emulsifiable polyisocyanate mixture I or II is 0.5 to 100 parts by weight per 100 parts by weight of the water-soluble resin, the solid content of the aqueous emulsion or a total thereof.

This invention further provides an aqueous dispersion for use as a paint or adhesive which comprises the above-mentioned self-emulsifiable polyisocyanate mixture I or II, water and, if necessary, an additive wherein the content of the self-emulsifiable polyisocyanate mixture I or II is 0.5 to 100 parts by weight per 100 parts by weight of water.

DETAILED DESCRIPTION OF THE INVENTION

In order to obtain the isocyanate group-terminated modified hexamethylene diisocyanate (a) [referred to hereinafter as the NCO-terminated modified HDI (a)]used in the preparation of the self-emulsifiable polyisocyanate mixture I or II, for example, HDI is urethanated with a dihydric alcohol and thereafter the reaction mixture is subjected to polymerization reaction using a polymerization catalyst for allowing isocyanurate-forming reaction or both isocyanurate-forming reaction and uretdione-forming reaction to proceed and, if necessary, a cocatalyst, for example, a phenolic hydroxyl group-containing compound, an alcoholic hydroxyl group-containing compound.

When the desired conversion has been reached, a terminator such as phosphoric acid, methyl p-toluenesulfonate or the like is added to the reaction system to terminate the reaction. The reaction temperature is preferably in the range of 40° to 90° C. When free unreacted HDI monomer remains in the reaction mixture, this is removed by a suitable means such as extraction with n-hexane or a thin film distillation at a reduced pressure of 0.01 to 0.1 Torr, to a content of not more than 1% by weight.

In the production of the NCO-terminated modified HDI (a), the starting material to be urethanated with the dihydric alcohol may be an NCO group-containing HDI polymer obtained using an isocyanurate-forming catalyst or an HDI polymer containing both isocyanurate group and uretdione group obtained using a polymerization catalyst for allowing both isocyanurate-forming reaction and uretdione-forming reaction to proceed simultaneously. The isocyanurate group-containing HDI polymer and the HDI polymer containing both isocyanurate group and uretdione group may be mixed in any proportion and then used as the starting material.

The effective polymerization catalyst for the isocyanurate-forming reaction includes hydroxides of tetraalkylammonium and hydroxyethylammonium; tertiary amines; alkyl-substituted ethyleneimines; tertiary alkylphosphines; acetylacetone metal salts; metal salts of organic acids such as alkali metal salts of alkylcarboxylic acids; and the like. The effective polymerization catalyst for allowing both isocyanurate-forming reaction and uretdione-forming reaction to proceed simultaneously is preferably a phosphine such as triethylphosphine, dibutylethylphosphine, tripropylphosphine, triisopropylphosphine, tributylphosphine, triisobutylphosphine, tritert-butylphosphine, triamylphosphine, trioctylphosphine, tribenzylphosphine, benzylmethylphosphine or the like. These catalysts may be used alone or if necessary in combination.

When the viscosity of the self-emulsifiable polyisocyanate mixture I or II is high, the dispersibility thereof in water or a water-soluble resin or aqueous emulsion becomes inferior, and hence, the workability becomes inferior. In such a case, it is preferable to introduce a uretdione group, which has a lower molecular weight than isocyanurate group, to lower the viscosity of the self-emulsifiable polyisocyanate mixture I or II.

The isocyanate group-terminated modified isophorone diisocyanate (b) having at least isocyanurate group [referred to hereinafter as the NCO-terminated modified IPDI (b)] used in the preparation of the self-emulsifiable polyisocyanate mixture I of this invention can be obtained by carrying out the reaction using a polymerization catalyst for allowing isocyanurate-forming reaction to proceed and if necessary, a cocatalyst, and terminating the reaction by adding a terminator such as phosphoric acid, methyl p-toluenesulfonate or the like when the desired conversion has been reached.

The reaction temperature therefor is preferably in the range of 40° to 150° C. When free unreacted IPDI monomer remains in the reaction mixture, it is removed by a suitable means such as extraction with n-hexane or thin film distillation at a reduced pressure of 0.01 to 0.1 Torr to a content of not more than 1% by weight.

In order to obtain the isocyanate group-terminated modified tolylene diisocyanate (c) having at least isocyanurate group [referred to hereinafter as the NCO-terminated modified TDI (c)] used in the preparation of the self-emulsifiable polyisocyanate mixture II of this invention, the reaction is carried out using 2,4-TDI, 2,6-TDI or a mixture of the two at any ratio as the starting material and using a polymerization catalyst for allowing isocyanurate-forming reaction to proceed and, if necessary, a cocatalyst.

When the desired conversion has been reached, a terminator such as phosphoric acid, methyl p-toluenesulfonate or the like is added to the reaction mixture to terminate the reaction. The reaction temperature therefor is preferably 40° to 90° C.

The effective isocyanurate-forming catalyst and the optional cocatalyst used in the preparation of the NCO-terminated modified IPDI (b) and the NCO-terminated modified TDI (c) include the same as the isocyanurate-forming catalyst and cocatalyst used for obtaining the NCO-terminated modified HDI (a).

When it is desired to make better the compatibility with the skeleton of the water-soluble resin or aqueous emulsion and to make better the gloss and image clarity, the dihydric alcohol used in the synthesis of the NCO-terminated modified HDI (a) may be introduced by urethanation into the NCO-terminated modified IPDI (b) or the NCO-terminated modified TDI (c).

In the preparation of the NCO-terminated modified HDI (a), the NCO-terminated modified IPDI (b) or the NCO-terminated modified TDI (c), an inert solvent which is usually used in the polyurethane industry may be used, for example, an aromatic hydrocarbon solvent such as toluene, xylene, Swasol (an aromatic hydrocarbon solvent manufactured by Cosmo Petroleum K. K.), Solvesso (an aromatic hydrocarbon solvent manufactured by Exxon Chemical Corp.) or the like; a ketone solvent such as methyl ethyl ketone, methyl isobutyl ketone, cyclohexanone or the like; an ester solvent such as ethyl acetate, butyl acetate, isobutyl acetate or the like; a glycol ether ester solvent such as ethylene glycol ethyl ether acetate, propylene glycol methyl ether acetate, 3-methyl-3-methoxybutyl acetate, ethyl 3-ethoxypropionate or the like; or an ether solvent such as tetrahydrofuran, dioxane or the like. These may be used alone or in admixture of two or more.

The use of the solvent makes it possible to control the viscosity of the solution after the reaction so as to meet the conditions used. Preferable solvents are polar solvents which can be dispersed in or are compatible with water, for example, ketone solvents, ester solvents, ether solvents or the like because the self-emulsifiable polyisocyanate mixture I or II is added to a water-soluble resin or an aqueous emulsion when used.

When the polar solvent is contained, the self-emulsifiable polyisocyanate mixture I or II has a lower viscosity, and becomes easy to disperse in the water-soluble resin or the aqueous emulsion. Also, the solvent used in the synthesis is, if unnecessary, removed by an operation such as distillation or the like.

In the isocyanate mixture which is the starting material for producing the self-emulsifiable polyisocyanate mixture I, the weight ratio of the NCO-terminated modified HDI (a) to the NCO-terminated modified IPDI (b) mixed is 99:1 to 50:50, preferably 98:2 to 45:55 and more preferably 95:5 to 35:65. The use of a NCO-terminated modified non-yellowing IPDI (b) makes it possible to achieve a high hardness and enhance the quick drying properties without damaging the weather resistance. When the amount of the NCO-terminated modified IPDI (b) mixed is smaller than the above range, it is impossible to obtain a high hardness and quick drying properties and to obtain the pot-life extending effect based on the mild reactivity of NCO group which the IPDI has. On the other hand, when the amount of the NCO-terminated modified IPDI (b) is larger than the above range, the viscosity of the self-emulsifiable polyisocyanate mixture I becomes high and the workability becomes inferior.

The weight ratio of the NCO-terminated modified HDI (a) to the NCO-terminated modified TDI (c) in the isocyanate mixture which is the starting material for producing the self-emulsifiable polyisocyanate mixture II is 99:1 to 70:30, preferably 98:2 to 75:25 and more preferably 95:5 to 80:20. Since TDI is less expensive than the non-yellowing HDI, the use of the NCO-terminated modified TDI (c) results in a reduction of cost. When the amount of the NCO-terminated modified TDI (c) mixed is smaller than the above range, it is impossible to obtain a high hardness and quick drying properties aimed at in this invention. When the amount of the NCO-terminated modified TDI (c) is larger than the above range, the weather resistance is deteriorated.

The dihydric alcohol to be introduced into the NCO-terminated modified HDI (a) used for obtaining the self-emulsifiable polyisocyanate mixture I or II of this invention includes 1,3-butanediol, neopentyl glycol, 2,2-diethyl-1,3-propanediol, 2-n-butyl-2-ethyl-1,3-propanediol, 2,2,4-trimethyl-1,3-pentanediol, 2-ethyl-1,3-hexane-diol, 2-n-hexadecane-1,2-ethylene glycol, 2-n-eicosane-1,2-ethylene glycol, 2-n-octacosane-1,2-ethylene glycol, hydrogenated bisphenol A, dipropylene glycol, 3-hydroxy-2,2-dimethylpropyl-3-hydroxy-2,2-dimethylpropionate and the like. Among them, 1,3-butanediol and 2-n-butyl-2-ethyl-1, 3-propanediol are preferable.

The molecular weight thereof is preferably 62 to 3,000, particularly preferably 100 to 1,000. Also, the above dihydric alcohols may be used in combination of two or more.

The above dihydric alcohol has a hydrocarbon group in its skeleton and hence has a good compatibility with the skeletal portion of the water-soluble resin or aqueous emulsion, so that the gloss and image clarity of a coating film obtained from the composition become good. The above dihydric alcohol is bifunctional, and hence, is introduced into not the terminals but the center portion of each molecule of the self-emulsifiable polyisocyanate mixture I or II, so that it can act more effectively. The dihydric alcohol is hydrophobic, and hence, contributes to the enhancement of stability of NCO group in the water-soluble resin and aqueous emulsion.

Incidentally, when the NCO-terminated modified HDI (a) is produced, the catalytic effect of the urethane linkage resulting from urethanation with the dihydric alcohol enables the isocyanurate-forming reaction or both isocyanurate-forming reaction and uretdione-forming reaction to proceed smoothly without producing a partial gelation product (high molecular weight product).

The amount of the dihydric alcohol introduced into the NCO-terminated modified HDI (a) is 0.1 to 15% by weight, preferably 0.3 to 10% by weight and more preferably 0.5 to 5% by weight, as the amount of the dihydric alcohol bound in the self-emulsifiable polyisocyanate mixture I or II (in other words, based on the weight of the self-emulsifiable polyisocyanate mixture). When the amount of the dihydric alcohol introduced is smaller than the above range, such a problem is caused that the compatibility with the water-soluble resin or aqueous emulsion becomes low and a partial gelation product is produced at the time of synthesis. On the other hand, when the amount is larger than the above range, it is impossible to sufficiently develop the characteristics of the isocyanurate group and uretdione group formed by polymerization and the NCO-terminated modified IPDI (b) and the NCO-terminated modified TDI (c), and it is also impossible to achieve a high hardness and enhance the weather resistance and heat resistance.

The nonionic hydrophilic surfactant (1) having one or more active hydrogen atoms capable of reacting with NCO group for obtaining the self-emulsifiable polyisocyanate mixtures I and II of this invention includes polyalkylene ether alcohols, polyoxyalkylene fatty acid esters and the like.

Active hydrogen compounds which are used as an initiator in the production of the polyalkylene ether alcohol include, for example, methanol, n-butanol, cyclohexanol, phenol, ethylene glycol, propylene glycol, aniline, trimethylolpropane, glycerine and the like. Among them, when dispersion stability is taken into account, the use of a short chain alcohol is preferred because a more hydrophilic surfactant can be obtained.

Fatty acids which are used in the production of the polyoxyalkylene fatty acid ester include acetic acid, propionic acid, butyric acid and the like. Among them, when dispersion stability is taken into consideration, the use of a lower fatty acid is preferred because a more hydrophilic surfactant can be produced.

The polyether chain present in the polyalkylene ether alcohol, the polyoxyalkylene fatty acid ester or the like is composed of 3 to 90 alkylene oxide units, preferably 5 to 50 alkylene oxide units and more preferably 8 to 20 alkylene oxide units. The alkylene oxide unit may be composed of only ethylene oxide unit, or a mixed alkylene oxide unit comprising at least 70% of ethylene oxide unit.

Ionic surfactants affect the reactivity of isocyanate and the coloration and deterioration of coating film in many cases, and precipitation, flocculation or the like is caused in some cases depending upon the ionic property of the water-soluble resin and aqueous emulsion. Therefore, the use of the nonionic surfactant is necessary.

The content of the nonionic hydrophilic surfactant (1) in the self-emulsifiable polyisocyanate mixture of this invention is 0.1 to 40% by weight, preferably 0.5 to 30% by weight and more preferably 1 to 20% by weight. When the amount of the nonionic hydrophilic surfactant introduced is less than 0.1% by weight, the polyisocyanate modified with this component exhibits substantially no improvement in water-dispersibility, and, precipitation or the like tends to be caused. On the other hand, when the amount of the nonionic hydrophilic surfactant introduced is more than 40% by weight, the affinity of the modified polyisocyanate for water becomes too strong and hence the stability of NCO group in water is deteriorated.

When the amount of the nonionic hydrophilic surfactant introduced is too large, it is possible to keep the balance of hydrophilicity by increasing the amounts of the dihydric alcohol and the aliphatic compound having one or more active hydrogen atoms capable of reacting with NCO group and having 8 or more carbon atoms; however, the NCO content of the self-emulsifiable polyisocyanate mixture becomes low and it becomes difficult to enhance the weather resistance or the like of a coating film.

The aliphatic compound (2) having one or more active hydrogen atoms capable of reacting with NCO group and having 8 or more carbon atoms is introduced when the hydrophilicity is so large that the stability of NCO group in water or a water-soluble resin or aqueous emulsion is deteriorated. It is considered that after this aliphatic compound has reacted with the isocyanate mixture, its hydrophilic chain portion inhibit the reaction of the unreacted NCO groups present in the neighborhood with the water molecules present therearound by steric hindrance or surface-chemically on the basis of the hydrophilicity. Accordingly, the hydrophilic chain having a length to some extent is more effective and the aliphatic compound is required to have 8 or more carbon atoms, preferably 12 or more carbon atoms. It is more preferable that the active hydrogen atoms reacting with NCO group are present in the neighborhood of the center of the main chain than they are present at the terminals.

The aliphatic compound having one or more active hydrogen atoms capable with NCO group and having 8 or more carbon atoms includes monohydric alcohols such as octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, cinnamyl alcohol and the like.

The aliphatic compound having one or more hydrogen atoms capable of reacting with NCO group and having 8 or more carbon atoms may also be a fatty acid ester in which the total sum of the carbon atoms which the starting fatty acid and alcohol have is 8 or more. The starting fatty acid includes α-hydroxypropionic acid, hydroxysuccinic acid, dihydroxysuccinic acid, ε-hydroxy-propane-1,2,3-tricarboxylic acid, hydroxyacetic acid, α-hydroxybutyric acid, hydroxystearic acid, ricinoleic acid, ricinoelaidic acid, ricinostearolic acid, salicylic acid, mandelic acid and the like, and the starting alcohol includes, for example, methyl alcohol, ethyl alcohol, propyl alcohol, isopropyl alcohol and butyl alcohol.

The content of the aliphatic compound (2) in the self-emulsifiable polyisocyanate mixture of this invention is 0 to 30% by weight, preferably 0 to 25% by weight and more preferably 0 to 20% by weight. When the content of the aliphatic compound (2) is more than 30% by weight, the dispersion stability becomes low.

When the amounts of the dihydric alcohol, the nonionic hydrophilic surfactant (1) and the aliphatic compound (2) introduced are too large, the NCO content of the self-emulsifiable polyisocyanate mixture is relatively reduced; it becomes impossible to sufficiently develop the characteristic features of the isocyanurate group and uretdione group; and the lowering of viscosity and the enhancement of weather resistance and heat resistance cannot be achieved.

Accordingly, the upper limit of the modification of the isocyanate mixture with the dihydric alcohol, the nonionic hydrophilic surfactant (1) and the aliphatic compound (2) should be such that the average NCO functionality of the self-emulsifiable polyisocyanate mixture I or II becomes 2.0 or more.

The NCO content of the self-emulsifiable polyisocyanate mixture I or II is preferably 5 to 25% by weight, more preferably 6 to 24.5% by weight and most preferably 7 to 24% by weight.

When the NCO content is less than 5% by weight, the addition effect becomes small and hence such a small NCO content is not desirable.

The self-emulsifiable polyisocyanate mixture I or II of this invention can be blended with a water-soluble resin and/or an aqueous emulsion and then used as an aqueous coating composition (including aqueous coating agent) or an aqueous adhesive composition for metals, wooden articles, plastics, inorganic materials and the like, and also as a sealer, an ink, a fiber-treating agent for natural or synthetic fibers, glass fibers or the like or a sizing agent.

The addition effect of the self-emulsifiable polyisocyanate mixture I or II is that excellent physical properties, heat resistance, water resistance, solvent resistance, adhesiveness and the like can be imparted to the resulting coating film as compared with conventional ones.

The water-soluble resin used in this invention includes polyvinyl alcohol, water-soluble ethylene-vinyl acetate copolymer, polyethylene oxide, water-soluble acrylic resin, water-soluble epoxy resin, water-soluble cellulose derivative, water-soluble polyester, water-soluble lignin derivative, water-soluble fluorine-containing resin, water-soluble silicone resin and the like.

The aqueous emulsion used in this invention includes all so-called latexes and emulsions, for example, styrene-butadiene copolymer latex, acrylonitrile-butadiene copolymer latex, methyl methacrylate-butadiene copolymer latex, chloroprene latex, polybutadiene latex and the like; polyacrylic acid ester latex; polyvinylidene chloride latex; polybutadiene latex; carboxyl-modified products of these latexes; polyvinyl chloride emulsion; urethane-acrylic rubber emulsion; silicone-acrylic rubber emulsion; vinyl acetate-acrylic rubber emulsion; urethane rubber emulsion; acrylic rubber emulsion; and the like.

Fluorine-containing polymer emulsions having excellent weather resistance and contamination resistance are poor in solvent resistance because they are not cross-linked; however, when they are used in combination with the self-emulsifiable polyisocyanate mixture I or II of this invention, the weather resistance, contamination resistance and solvent resistance are further improved.

Even when the water-soluble resin and/or aqueous emulsion used in this invention has no or only a little active hydrogen atom capable of reacting with NCO group, the self-emulsifiable polyisocyanate mixture I or II can react with water in the water-soluble resin and/or aqueous emulsion to form a polyurea compound whereby a hard and tough coating film is formed, so that the weather resistance of the coating film is enhanced. In addition, since NCO group reacts with the active hydrogen atom present on the surface of an adherend, the adhesiveness is also enhanced.

On the other hand, when a water-soluble resin and/or aqueous emulsion having many active hydrogen atoms capable of reacting with NCO group is used, the active hydrogen atoms in the water-soluble resin and/or aqueous emulsion react with the NCO group present in the self-emulsifiable polyisocyanate mixture I or II to form a cross-linked structure, so that the weather resistance, solvent resistance and the like of the resulting coating film are further improved.

Also, when baking is effected at high temperatures, the uretdione group is dissociated to generate NCO group, and hence, in the baking case, the addition effect is remarkably exhibited as compared with the use at ordinary temperature. Therefore, the water-soluble resin and/or aqueous emulsion should preferably have active hydrogen atoms capable of reacting with NCO group.

In the aqueous coating composition or aqueous adhesive composition of this invention, the proportion of the self-emulsifiable polyisocyanate mixture to the water-soluble resin and/or aqueous emulsion is 0.5 to 100 parts by weight, preferably 1 to 60 parts by weight and more preferably 5 to 40 parts by weight, per 100 parts by weight of the water-soluble resin, the solid content of the aqueous emulsion or a total thereof.

The self-emulsifiable polyisocyanate mixture I or II of this invention can be mixed with water to prepare an aqueous dispersion, and this aqueous dispersion can be used as an aqueous paint (including aqueous coating agent) or an aqueous adhesive for paper, wooden materials, plastics, metallic materials, inorganic materials and the like.

In the above aqueous dispersion, the proportion of the self-emulsifiable polyisocyanate mixture I or II to water is 0.5 to 100 parts by weight, preferably 10 to 100 parts by weight and more preferably 20 to 50 parts by weight, per 100 parts by weight of water.

This aqueous dispersion is considered to become a paint or adhesive having a very good adhesiveness because NCO group is relatively stably present even after the dispersion in water and reacts with the active hydrogen atoms present on the surface of the above-mentioned substrates. Even after a considerable time has elapsed from the dispersion of the self-emulsifiable polyisocyanate mixture I or II in water and the NCO group has disappeared, the aqueous dispersion is present stably in the emulsion state in which the dispersed particles have a diameter of about 0.1 to 0.3 μm and the coating film comprising mainly a polyurea compound obtained by drying at ordinary temperature or heat-drying the aqueous dispersion becomes hard and tough, so that the above aqueous dispersion can be used in the form of a film or sheet or in the form of a paint (including a coating agent) for various substrates. Incidentally, when the adhesiveness to a substrate is important, it is preferable that the aqueous dispersion is used in the state that NCO groups are still present.

The aqueous coating or adhesive composition comprising the self-emulsifiable polyisocyanate mixture I or II and the water-soluble resin and/or aqueous emulsion may, if necessary, contain additives which are usually used in the aqueous binary system.

For example, a pigment, a dispersion stabilizer, a viscosity-adjusting agent, a levelling agent, an antigelling agent, a light stabilizer, an antioxidant, an ultraviolet absorber, a heat-resistance-enhancing agent, an inorganic or organic filler, a plasticizer, a lubricant, an antistatic agent, a reinforcing agent, a catalyst, a cocatalyst and the like can be added alone or in combination to the above aqueous coating or adhesive composition.

The aqueous dispersion for use as a paint or adhesive comprising water and the self-emulsifiable polyisocyanate mixture I or II of this invention can contain the above-mentioned additives.

In the self-emulsifiable polyurethane mixture I or II of this invention, not only the hardness of coating film but also the drying rate can be enhanced; also the pot life can be extended by using the NCO-terminated modified HDI (a) having a soft skeleton together with the NCO-terminated modified IPDI (b) having at least isocyanurate group and having a hard skeleton or the NCO-terminated modified TDI (c) having at least isocyanurate group; and also the compatibility with polyol resins, the dispersion stability in water or a water-soluble resin or aqueous emulsion and the enhancement of the stability of NCO group in water can be achieved thereby. Also, since the compatibility with a polyol resin is enhanced, the gloss and image clarity (coating appearance) of a coating film obtained form the above composition are improved, and the water resistance, solvent resistance and adhesiveness to a substrate of the coating film are also excellent. Moreover, by introducing isocyanurate group and uretdione group into the self-emulsifiable polyisocyanate mixture I or II, the heat resistance and weather resistance can be enhanced and the workability is improved on the basis of the lowering of viscosity. When the NCO-terminated modified TDI (c) is co-used, the cost can be reduced while the weather resistance is retained to some extent. Furthermore, the adhesive obtained is excellent in bonding strength.

DESCRIPTION OF THE PREFERRED EMBODIMENTS

Examples are shown below for explaining this invention in more detail; however, this invention should not be construed to be limited to the Examples. Unless otherwise specified, "part" and "%" used in Production Examples, Examples and Comparative Examples are by weight.

Production of Self-emulsifiable Polyisocyanate Mixture

Production of modified HDI
Production Example 1

In a reactor equipped with a stirrer, a thermometer, a nitrogen-sealing tube and a condenser were placed 300 parts of HDI and 2.3 parts of 2-n-butyl-2-ethyl-1,3-propanediol, and the reactor was purged with nitrogen. The mixture was warmed to a reaction temperature of 60°–70° C. with stirring, and subjected to reaction at the same temperature for three hours. At this time, the NCO content in the reaction mixture was measured to find that it was 49.1%.

Subsequently, 0.3 part of tributylphosphine was added as a catalyst, and the mixture was subjected to uretdione-forming reaction and isocyanurate-forming reaction at the same temperature for eight hours.

To the resulting reaction mixture was added 0.33 part of methyl p-toluenesulfonate to terminate the reaction, and thereafter, the unreacted HDI monomer was removed by a thin film distillation at 120° C. at 0.01 Torr. The solution thus obtained was pale yellow and transparent; the NCO content was 22.3%; the viscosity was 99 cP/25° C.; the HDI monomer content was 0.4%, the NCO functionality was 2.3; the bound dihydric alcohol content was 3.0%; and the yield was 25%.

Also, it was confirmed from FT-IR and $^{13}$C-NMR that in the product were present NCO group, uretdione group, isocyanurate group and urethane group.

The NCO-terminated modified HDI containing uretdione group and isocyanurate group thus obtained is referred to hereinafter as a-1.

Production Example 2

In a reactor equipped with a stirrer, a thermometer, a nitrogen-sealing tube and a condenser were placed 300 parts of HDI and 2.4 parts of 1,3-butanediol, and the reactor was purged with nitrogen, after which the mixture was warmed to a reaction temperature of 80° C. with stirring and subjected to reaction at the same temperature for two hours. As this time, the NCO content of the reaction mixture was measured to find that it was 48.8%.

Subsequently, 0.06 part of potassium caprate was added as a catalyst and 0.3 part of phenol was added as a cocatalyst, after which the resulting mixture was subjected to isocyanurate-forming reaction at 60° C. for 4.5 hours.

To the reaction mixture was added 0.042 part of phosphoric acid as a terminator to terminate the reaction and after stirring at the same temperature for one hour, the unreacted HDI monomer was removed by a thin film distillation at 120° C. at 0.01 Torr.

The solution thus obtained was pale yellow and transparent; the NCO content was 21.1%, the viscosity was 2,200 cP/25° C.; the HDI monomer content was 0.4%; the NCO functionality was 3.7; the bound dihydric alcohol content was 2.5%; and the yield was 32%.

It was confirmed from FT-IR and $^{13}$C-NMR that in the product were present NCO group, isocyanurate group and urethane group, but the presence of uretdione group was not confirmed. The NCO-terminated modified HDI containing isocyanurate group thus obtained is referred to as a-2.

Production Example 3

In a reactor equipped with a stirrer, a thermometer, a nitrogen-sealing tube and a condenser were placed 300 parts of HDI and 5.0 parts of 2,2,4-trimethyl-1,3-pentanediol, and the reactor was purged with nitrogen, after which the mixture was warmed to a reaction temperature of 60°–70° C. with stirring and subjected to reaction at the same temperature for three hours. At this time, the NCO content was measured to find that it was 48.2%.

Subsequently, 0.3 part of tributylphosphine was added as a catalyst and the resulting mixture was subjected to uretdione-forming reaction and isocyanurate-forming reaction at the same temperature for eight hours.

To the reaction mixture was added 0.33 part of methyl p-toluenesulfonate to terminate the reaction, and the unreacted HDI monomer was then removed by a thin film distillation at 120° C. at 0.01 Torr. The solution thus obtained was pale yellow and transparent; the NCO content was 22.0%; the viscosity was. 120 cP/25° C.; the HDI monomer content was 0.3%, the NCO functionality was 2.3; the bound dihydric alcohol content was 6.3%; and the yield was 26%.

From FT-IR and $^{13}$C-NMR, it was confirmed that in the product were present NCO group, uretdione group, isocyanurate group and urethane group.

The NCO-terminated modified HDI containing uretdione group and isocyanurate group thus obtained is referred to hereinafter as a-3.

Production Example 4

In a reactor equipped with a stirrer, a thermometer, a nitrogen-sealing tube and a condenser were placed 300 parts of HDI and 1.0 part of neopentyl alcohol and the reactor was purged with nitrogen, after which the mixture was warmed to a reaction temperature of 80° C. with stirring, and then subjected to reaction at the same temperature for two hours. At this time, the NCO content was measured to find that it was 49.5%.

Subsequently, 0.06 part of potassium caprate was added as a catalyst and 0.3 part of phenol was added as a cocatalyst, after which the mixture was subjected to isocyanurate-forming reaction at 60° C. for 4.5 hours.

To this reaction mixture was added 0.042 part of phosphoric acid as a terminator, and after stirring at the same temperature for one hour, the unreacted HDI monomer was removed by a thin film distillation at 120° C. at 0.01 Torr.

The solution thus obtained was pale yellow and transparent; the NCO content was 21.2%; the viscosity was 2,300 cP/25° C.; the HDI monomer content was 0.4%; the NCO functionality was 3.6; the bound dihydric alcohol content was 1.1%; and the yield was 30%.

From FT-IR and $^{13}$C-NMR, it was confirmed that in the product were present NCO group, isocyanurate group and urethane group, but the presence of uretdione group was not confirmed. The NCO-terminated modified HDI containing isocyanurate group thus obtained is referred to hereinafter as a-4.

Production of Self-emulsifiable Polyisocyanate Mixture

Example 1

To 70 parts of the NCO-terminated modified HDI a-1 and 30 parts of a modified IPDI containing isocyanurate group (IPDI-T-1890, NCO content: 17.0%, a trade name of Daicel Huels K. K.) was added 16 parts of polyoxyethylene methyl ether (hydroxyl value: 140, number of ethylene oxide units: 9, manufactured by TOHO CHEMICAL INDUSTRY CO., LTD.), and the temperature of the resulting mixture was elevated, after which the mixture was subjected to reaction for three hours while kept at 75° C., to obtain a pale yellow, transparent, self-emulsifiable polyisocyanate mixture (A) having an NCO content of 16.4%, a viscosity of 810 cP/25° C., a free NCO monomer content of 0.5%, an NCO functionality of 2.4, a dihydric alcohol content of 1.8% and a hydrophilic surfactant content of 13.7%.

EXAMPLES 2 TO 9 AND COMPARATIVE EXAMPLES 1 TO 3

The same procedure as in Example 1 was repeated, except that one of the starting compositions shown in Table 1 and Table 2 was used, to prepare a self-emulsifiable polyisocyanate mixture. The mixtures thus obtained are referred to hereinafter as B, C, D, E, F, G, H, I, J, K and L, respectively.

Incidentally, C-2030 (a trade name of Nippon Polyurethane Industry Co., Ltd., NCO content: 8.0%, viscosity: 1,000 cP/25° C., solid content: 50%) was used as an isocyanurate group-containing TDI polymer, and methyl ricinoleate (hydroxyl value: 160, manufactured by Ito Seiyu K. K.) was used as an aliphatic compound.

To 100 parts of one of the self-emulsifiable polyisocyanate mixtures obtained was added 500 parts of water, and the resulting mixture was well mixed by a laboratory mixer and the NCO-residual time in the resulting dispersion was measured.

The compositions of the starting isocyanate mixtures used and the compositions and characteristics of the self-emulsifiable polyisocyanate mixtures obtained are shown together in Table 1 and Table 2.

TABLE 1

| | Example | | | | | |
|---|---|---|---|---|---|---|
| | 1 | 2 | 3 | 4 | 5 | 6 |
| Self-emulsifiable polyisocyanate mixture | A | B | C | D | E | F |
| Dihydric alcohol content (%) | 1.8 | 2.3 | 2.3 | 2.2 | 1.6 | 2.3 |
| Hydrophilic surfactant content (%) | 13.7 | 10.3 | 2.0 | 7.4 | 14.5 | 7.3 |
| Aliphatic compound content (%) | | 3.4 | | | 13.0 | 1.8 |
| NCO content (%) | 16.4 | 17.2 | 20.3 | 17.2 | 11.1 | 18.1 |
| Functionality | 2.4 | 2.2 | 3.7 | 2.9 | 3.0 | 2.7 |
| Composition of starting isocyanate mixture (%) | | | | | | |
| NCO-terminated modified HDI | | | | | | |
| a-1 | 70 | 90 | | 80 | | 60 |
| a-2 | | | 95 | | 90 | 20 |
| IPDI polymer | 30 | 10 | 5 | | | 20 |
| TDI polymer | | | | 20 | 10 | |
| Characteristics of self-emulsifiable polyisocyanate mixture | | | | | | |
| Viscosity (cP/25° C.) | 810 | 190 | 2800 | 200 | 2100 | 720 |
| Solid content (%) | 100 | 100 | 100 | 90.7 | 96.3 | 100 |
| NCO-residual time in water dispersion (hrs) | 6.5 | 5.0 | 6.0 | 4.0 | 5.0 | 5.0 |

TABLE 2

| | Example | | | Comparative Ex. | | |
|---|---|---|---|---|---|---|
| | 7 | 8 | 9 | 1 | 2 | 3 |
| Self-emulsifiable polyisocyanate mixture | G | H | I | J | K | L |
| Dihydric alcohol content (%) | 2.5 | 4.8 | 0.5 | 2.6 | 1.0 | 1.2 |
| Hydrophilic surfactant content (%) | 10.7 | 3.8 | 16.4 | 13.8 | 10.3 | 7.4 |
| Aliphatic compound content (%) | | | 15.1 | | 3.4 | |
| NCO content (%) | 17.7 | 20.0 | 8.0 | 17.8 | 14.9 | 12.7 |
| Functionality | 3.3 | 2.5 | 3.0 | 2.1 | 2.7 | 4.7 |
| Composition of starting isocyanate mixture (%) | | | | | | |
| NCO-terminated modified HDI | | | | | | |
| a-1 | 15 | | | 100 | 40 | |
| a-2 | 80 | | | | | 50 |
| a-3 | | 80 | | | | |
| a-4 | | | 70 | | | |
| IPDI polymer | 5 | 20 | | | 60 | |
| TDI polymer | | | 30 | | | 50 |
| Characteristics of self-emulsifiable polyisocyanate mixture | | | | | | |
| Viscosity (cP/25° C.) | 1900 | 400 | 3300 | 160 | 66000 | 1730 |
| Solid content (%) | 100 | 100 | 89.7 | 100 | 100 | 72.2 |
| NCO-residual time in water dispersion(hrs) | 6.0 | 6.0 | 4.5 | 3.0 | 1) | 3.0 |

Note: 1): The self-emulsifiable polyisocyanate mixture had too large viscosity to be dispersed.

By introducing, into the self-emulsifiable polyisocyanate mixture, the NCO-terminated modified HDI, the IPDI polymer or the TDI polymer in a well-balanced proportion, the NCO stability became large and the pot life was extended without deteriorating the workability. [Preparation of aqueous paint and evaluation of coating film]

Production of Aqueous Urethane Rubber Emulsion

Production Example 5

In a reactor equipped with a stirrer, a thermometer, a nitrogen-sealing tube and a condenser were placed 461.1 parts of Nippollan 980N (a trade name of Nippon Polyurethane Industry Co., Ltd. for a polycarbonatediol having a molecular weight of 2,000), 150.1 parts of IPDI and 0.06 part of dibutyltin dilaurate, and the temperature of the mixture was elevated, after which the mixture was subjected to reaction for two hours while kept at 75° C., to obtain a reaction mixture having an NCO content of 6.0%. Subsequently, this reaction mixture was cooled to 40° C. and then 29.6 parts of dimethylolpropionic acid and 252.8 parts of acetone were added thereto, after which the resulting mixture was subjected to reaction for three hours, to obtain a reaction mixture having an NCO content of 1.8%.

Further, to this reaction mixture were added 273.2 parts of acetone, 30.3 parts of isophoronediamine and 2.4 parts of monoethanolamine, and the resulting mixture was subjected to reaction for 20 minutes. To the reaction mixture was added 1,562.5 parts of water and the resulting mixture was stirred at a high speed to cause phase inversion. The acetone was removed by distillation from this mixture to obtain an aqueous urethane rubber emulsion having a viscosity of 100 cP/25° C. and a solid content of 30.1%, and containing active hydrogen atoms which can react at ordinary temperature. This is referred to hereinafter as urethane rubber emulsion A.

Production Example 6

In a reactor equipped with a stirrer, a thermometer, a nitrogen-sealing tube and a condenser were placed 317.2 parts of Nippollan 981 (a trade name of Nippon Polyurethane Industry Co., Ltd. for a polycarbonatediol having a molecular weight of 1,000), 133.4 parts of IPDI and 0.08 part of dibutyltin dilaurate, and the temperature of the resulting mixture was elevated, after which the mixture was subjected to reaction for two hours while kept at 75° C., to obtain a reaction mixture having an NCO content of 5.2%.

Subsequently, to this reaction mixture was added a polyoxyethylene methyl ether (hydroxyl value: 80, manufactured by Nippon Nyukazai Kogyo K. K.), and the resulting mixture was subjected to reaction for three hours, to obtain a reaction mixture having an NCO content of 4.6%. Furthermore, this reaction mixture was cooled to 25° C., after which 474.8 parts of acetone and 45.2 parts of isophoronediamine were added to the mixture, and the resulting mixture was subjected to reaction for 20 minutes.

To the reaction mixture was added 1,231.3 parts of water and the resulting mixture was stirred at a high speed to cause phase inversion. The acetone was removed by distillation from this mixture to obtain an aqueous urethane rubber emulsion having a viscosity of 700 cP/25° C. and a solid content of 27.9% and containing no active hydrogen atoms which can react at ordinary temperature. This urethane rubber emulsion is referred to hereinafter as urethane rubber emulsion B.

Formation of Coating Film

EXAMPLES 10, 11, 13 and 14 AND COMPARATIVE EXAMPLES 4, 5, 7 AND 8

80 Parts of the urethane rubber emulsion A or B was mixed with 18 parts of $TiO_2$ (white pigment) and 2 parts of an adjuvant [Vismul YK-1 (dispersion/thickening agent, manufactured by TOHO CHEMICAL INDUSTRY CO., LTD.) containing 0.5% of FS Antifoam 013B (defoaming agent manufactured by Dow Corning Corp.)], (the adjuvants used in the Examples and Comparative Examples appearing hereinafter are the same as above). Further, 5 parts of the self-emulsifiable polyisocyanate mixture obtained in Example 1 or 5 or Comparative Example 1 or 3 was added to the resulting mixture. The mixture was stirred with a glass rod, upon which the self-emulsifiable polyisocyanate mixture was easily dispersed.

This dispersion was coated on an aluminum plate which had been treated with a surface-treating agent, by means of a bar coater so that the dried coating film had a thickness of 30 to 40 μm.

EXAMPLES 12 AND 15 AND COMPARATIVE EXAMPLES 6 AND 9

53 Parts of an acrylic rubber emulsion (WA-1015ND, a trade name of Ajia Kogyo K. K., solid content: 50%, viscosity: 300 cP/25° C.) (referred to hereinafter as acrylic rubber emulsion A) was mixed with 18 parts of $TiO_2$ (white pigment), 2 parts of an adjuvant and 27 parts of water, and to the resulting mixture was added 5 parts of the self-emulsifiable polyisocyanate mixture obtained in Example 1 or 5 or Comparative Example 1 or 3 and the mixture was stirred with a glass rod, upon which the self-emulsifiable polyisocyanate mixture was easily dispersed.

This dispersion was coated in the same manner as in Example 10.

Evaluation of Coating Film

After the coating in Examples 10 to 15 and Comparative Examples 4 to 9, drying was conducted at 80° C. for 20 minutes. The coating film was allowed to stand for a further one hour, and then evaluated for pencil hardness, gloss, water resistance, weather resistance [gloss retention (%) and degree of yellowing (ΔYI)] and for dry through time when the coating film was allowed to stand at room temperature.

Pencil hardness was measured according to JIS K5400. Gloss was determined by measuring specular gloss at an angle of incidence of 60° by a glossmeter. Water resistance was determined by checking the state of the coated surface after immersion in tap water at 20° C. for one day. Weather resistance was determined by measuring gloss retention (%) and degree of yellowing (ΔYI) after 2,000 hours according to JIS K5400 in a sun shine weatherometer (manufactured by Suga Shikenki K. K.) under the conditions that black panel temperature was 63°±3° C. the spraying time was 18 minutes per one cycle of 120 minutes. The print free time when the coating film was allowed to stand at room temperature was measured according to JIS K5400.

The results obtained are shown in Table 3. Incidentally, as to the starting materials used, only the kinds of the self-emulsifiable polyisocyanate mixtures and aqueous emulsions are shown. In Table 3, the mark "o" in the evaluation of water resistance means "pass".

TABLE 3

| | Example | | | | | |
|---|---|---|---|---|---|---|
| | 10 | 11 | 12 | 13 | 14 | 15 |
| Self-emulsifiable polyisocyanate mixture | A | A | A | E | E | E |
| Urethane rubber emulsion | A | B | | A | B | |
| Acrylic rubber emuslion | | | A | | | A |
| Pencil hardness | F | B | 2H | F | B | H |
| Gloss | 93 | 91 | 95 | 94 | 91 | 95 |
| Water resistance | o | o | o | o | o | o |
| Gloss retension (%) | 92 | 90 | 95 | 90 | 87 | 93 |
| Degree of yellowing (ΔYI) | 0.9 | 0.9 | 0.8 | 0.8 | 0.9 | 0.7 |
| Dry through time (hrs) | 12 | 13 | 10 | 10 | 12 | 10 |

| | Comparative Example | | | | | |
|---|---|---|---|---|---|---|
| | 4 | 5 | 6 | 7 | 8 | 9 |
| Self-emulsifiable polyisocyanate mixture | J | J | J | L | L | L |
| Urethane rubber emulsion | A | B | | A | B | |
| Acrylic rubber emulsion | | | A | | | A |
| Pencil hardness | 2B | 4B | 2B | F | B | 2H |
| Gloss | 94 | 90 | 96 | 85 | 83 | 84 |
| Water resistance | o | o | o | o | o | o |
| Gloss retention (%) | 90 | 89 | 93 | 45 | 40 | 48 |
| Degree of yellowing (ΔYI) | 0.9 | 1.0 | 0.9 | 35.6 | 39.8 | 45.2 |
| Dry through time (hrs) | 30 | 34 | 28 | 6 | 9 | 8 |

By introducing into the self-emulsifiable polyisocyanate mixture the NCO-terminated modified HDI, the IPDI polymer or the TDI polymer in a well-balanced proportion, the hardness of coating film became large and the dry through time became short without deteriorating the weather resistance. The evaluation of water resistance was good in all cases.

Preparation of Aqueous Adhesive and Evaluation Thereof

EXAMPLES 16 AND 17 AND COMPARATIVE EXAMPLE 10

A 3-mm thick polyurethane molded article by RIM, a FRP, an ABS or a steal plate (JIS G3141 <SPCC-SB>, specification: pf-1077, made by Nippon Test Panel Kogyo Kabushiki Kaisha, referred to hereinafter as bonderized steel plate) was degreased with trichloroethylene and then coated with a liquid mixture consisting of 100 parts of acrylic rubber emulsion A and 10 parts of the self-emulsifiable polyisocyanate mixture obtained in Example 3 or 5 parts of the self-emulsifiable polyisocyanate mixture obtained in Example 8 or Comparative Example 1 so that the dried coating film had a thickness of 40 to 50 μm. The resulting assembly was pre-dried at 80° C. for five minutes and two sheets of each of the above plates were put one on the other so that air bubbles were not present therebetween and allowed to stand at 80° C. at a pressure of 25 kg/cm² for 10 minutes.

After allowed to stand at 25° C. for 24 hours, each of the plates was cut to a 25-mm width and subjected to measurement of bonding strength (kg/25 mm) at a tensile speed of 100 mm/min according to JIS K6854. The results obtained are shown in Table 4. In Table 4, as to the starting materials used, only the kind of the self-emulsifiable polyisocyanate mixture is shown.

TABLE 4

|  |  | Example 16 | Example 17 | Comp. Ex. 10 |
|---|---|---|---|---|
| Self-emulsifiable poly-isocyanate mixture |  | C | H | J |
| Bonding strength (kg/25 mm) | RIM molded article | 25 | 30 | 10 |
|  | FRP | 30 | 35 | 15 |
|  | ABS | 24 | 29 | 11 |
|  | Bonderized steel plate | 33 | 35 | 12 |

By introducing into the self-modified polyisocyanate mixture the NCO-terminated modified HDI, the IPDI polymer or the TDI polymer, the bonding strength became large.

Preparation of Aqueous Paint and Evaluation of Coating Properties of a Coating Film Obtained Therefrom Preparation of aqueous paint and formation of coating film using the same

EXAMPLES 18 TO 20

To 30 parts of the self-emulsifiable polyisocyanate mixture obtained in Example 2, 4 or 7 was added 100 parts of water, and they were mixed by stirring with a glass rod, upon which the self-emulsifiable polyisocyanate mixture was easily dispersed in water. After a lapse of one hour, the dispersion was coated on an auto-claved asbestoscement silicate board and kept at room temperature for one hour and then at 80° C. for three hours to form a coating film.

COMPARATIVE EXAMPLES 11 AND 12

To 30 parts of the self-emulsifiable polyisocyanate mixture obtained in Comparative Example 1 or 3 was added 100 parts of water and they were stirred and mixed by means of a glass rod to obtain a dispersion, and using the dispersion, a coating film was formed in the same manner as in Example 18.

Evaluation of Coating Properties of Coating Film

The state and adhesiveness of the coating film obtained in each of Examples 18 to 20 and Comparative Examples 11 and 12 were evaluated. The state of coating film was observed visually. The adhesiveness was measured by a cross-cut test method according to JIS K5400. The results obtained are shown in Table 5. In Table 5, as to the starting materials used, only the kind of the self-emulsifiable polyisocyanate mixture is shown.

In Table 5, the criterion of the evaluation of state of coating film was as follows:

TABLE 5

| | Good o > Δ > x bad | | | | |
|---|---|---|---|---|---|
| | Example 18 | Example 19 | Example 20 | Comp. Ex. 11 | Comp. Ex. 12 |
| Self-emulsifiable polyisocyanate mixture | B | D | G | J | L |
| State of coating film | o | o | o | Δ | x |
| Cross-cut test (point) | 10 | 10 | 10 | 6 | 4 |

By introducing into the self-emulsified poly-isocyanate mixture the NCO-terminated modified HDI and the IPDI polymer or the TDI polymer in a well-balanced proportion, the state and adhesiveness of coating film became good.

Preparation and evaluation of aqueous adhesive

EXAMPLES 21 AND 22 AND COMPARATIVE EXAMPLE 13

A lauan veneer having a size of 2.5 cm×10 cm×3.0 mm was coated with a liquid mixture of 100 parts of water and 100 parts of the self-emulsifiable polyisocyanate mixture obtained in Example 6 or 9 or Comparative Example 1 so that the coating amount became 200 g/m² and the coating area became 2.5 cm×2.5 cm, and thereafter two coated lauan veneers of the same kind were put one on the other so that air bubbles were not present therebetween. The resulting assembly was allowed to stand at room temperature for two hours and then at 120° C. for ten minutes at a pressure of 10 kg/cm².

After being allowed to stand at 25° C. for 24 hours, the assembly was subjected to measurement of dry bonding strength (kg/cm²) and heat bonding strength (allowed to stand at 120° C. for 24 hours) using Tensilon UTM-500 manufactured by Kabushiki Kaisha Oriented at a tensile speed of 2 mm/min. The results obtained are shown in Table 6, provided that in Table 6, as to the starting materials used, only the kinds of the self-emulsifiable polyisocyanate mixtures are shown (the same applies hereinafter).

TABLE 6

| | Example 21 | Example 22 | Comp. Ex. 13 |
|---|---|---|---|
| Self-emulsifiable polyisocyanate mixture | F | I | J |
| Dry bonding strength (kg/cm²) | 36.1 | 34.3 | 15.3 |
| Heat bonding strength (kg/cm²) | 30.5 | 29.2 | 10.2 |

By introducing into the self-emulsifiable polyisocyanate mixture the NCO-terminated modified HDI and the IPDI polymer or the TDI polymer, the bonding strength became great.

What is claimed is:

1. A self-emulsifiable polyisocyanate mixture having an average NCO functionality of 2.0 to 4.2 obtained by reacting:
   (1) a nonionic hydrophilic surfactant having one or more active hydrogen atoms capable of reacting with isocyanate group and 3 to 90 alkylene oxide units and
   (2) an aliphatic compound having one or more active hydrogen atoms capable of reacting with isocyanate group and 8 or more carbon atoms,
   with an isocyanate mixture consisting of (a) an isocyanate group-terminated modified hexamethylene diisocyanate obtained by subjecting hexamethylene diisocyanate to urethanation with a dihydric alcohol and polymerization and then removing the unreacted hexamethylene diisocyanate monomer therefrom to a content of not more than 1% by weight and containing an isocyanurate group, and (b) an isocyanate group-terminated modified isophorone diisocyanate having at least isocyanurate group from which the unreacted isophorone diisocyanate monomer has been removed to a content of not more than 1% by weight, at a weight ratio of 99:1 to 50:50, wherein the dihydric alcohol is bonded in a proportion of 0.1 to 15% by weight based on the weight of the self-emulsifiable polyisocyanate mixture, the component (1) is bonded in a proportion of 0.1 to 40% by weight based on the weight of the self-emulsifiable polyisocyanate mixture and the component (2) is bonded in a proportion of 0 to 30% by weight based on the weight of the self-emulsifiable polyisocyanate mixture.

2. The self-emulsifiable polyisocyanate mixture according to claim 1, wherein the dihydric alcohol is bonded in a proportion of 0.3 to 10% by weight based on the weight of the self-emulsifiable polyisocyanate mixture.

3. The self-emulsifiable polyisocyanate mixture according to claim 2, wherein the nonionic hydrophilic surfactant is bonded in a proportion of 0.5 to 30% by weight based on the weight of the self-emulsifiable polyisocyanate mixture.

4. The self-emulsifiable polyisocyanate mixture according to claim 1, wherein the aliphatic compound is a fatty acid ester.

5. The self-emulsifiable polyisocyanate mixture according to claim 4, wherein the fatty acid ester is bonded in a proportion of 0 to 20% by weight based on the weight of the self-emulsifiable polyisocyanate mixture.

6. A self-emulsifiable polyisocyanate mixture having an average NCO functionality of 2.0 to 5.0 obtained by reacting:
   (1) a nonionic hydrophilic surfactant having one or more active hydrogen atoms capable of reacting with isocyanate group and 3 to 90 alkylene oxide units and
   (2) an aliphatic compound having one or more active hydrogen atoms capable of reacting with isocyanate group and 8 or more carbon atoms,
   with an isocyanate mixture consisting of (a) an isocyanate group-terminated modified hexamethylene diisocyanate containing an isocyanurate group and obtained by subjecting hexamethylene diisocyanate to urethanation with a dihydric alcohol and polymerization and then removing the unreacted hexamethylene diisocyanate monomer therefrom to a content of not more than 1% by weight and (c) an isocyanate group-terminated modified tolylene diisocyanate having at least isocyanurate group from which the unreacted tolylene diisocyanate monomer has been removed to a content of not more than 1% by weight, at a weight ratio of 99:1 to 70:30, wherein the dihydric alcohol is bonded in a proportion of 0.1 to 15% by weight based on the weight of the self-emulsifiable polyisocyanate mixture, the component (1) bonded in a proportion of 0.1 to 40% by weight based on the weight of the self-emulsifiable polyisocyanate mixture and the component (2) is bonded in a proportion of 0 to 30% by weight based on the weight of the self-emulsifiable polyisocyanate mixture.

7. The self-emulsifiable polyisocyanate mixture according to claim 6, wherein the dihydric alcohol is bonded in a proportion of 0.3 to 10% by weight based on the weight of the self-emulsifiable polyisocyanate mixture.

8. The self-emulsifiable polyisocyanate mixture according to claim 7, wherein the nonionic hydrophilic surfactant is bonded in a proportion of 0.5 to 30% by weight based on the weight of the self-emulsifiable polyisocyanate mixture.

9. The self-emulsifiable polyisocyanate mixture according to claim 6, wherein the aliphatic compound is a fatty acid ester.

10. The self-emulsifiable polyisocyanate mixture according to claim 9, wherein the fatty acid ester is bonded in a proportion of 0 to 20% by weight based on the weight of the self-emulsifiable polyisocyanate mixture.

11. An aqueous coating composition which comprises the self-emulsifiable polyisocyanate mixture according to claim 1 and at least one member selected from the group consisting of a water-soluble resin and an aqueous emulsion, the content of the self-emulsifiable polyisocyanate mixture being 0.5 to 100 parts by weight per 100 parts by weight of the water soluble resin, the solid content of the aqueous emulsion or a total weight thereof.

12. An aqueous coating composition which comprises the self-emulsifiable polyisocyanate mixture according to claim 1, at least one member selected from the group consisting of a water-soluble resin and an aqueous emulsion; and an additive, the content of the self-emulsifiable polyisocyanate mixture being 0.5 to 100 parts by weight per 100 parts by weight of the water soluble resin, the solid content of the aqueous emulsion or a total weight thereof.

13. An aqueous adhesive composition which comprises the self-emulsifiable polyisocyanate mixture according to claim 1 and at least one member selected from the group consisting of a water-soluble resin and an aqueous emulsion, the content of the self-emulsifiable polyisocyanate mixture being 0.5 to 100 parts by weight per 100 parts by weight of the water-soluble resin, the solid content of the aqueous emulsion or a total weight thereof.

14. An aqueous adhesive composition which comprises the self-emulsifiable polyisocyanate mixture according to claim 1; at least one member selected from the group consisting of a water-soluble resin and an aqueous emulsion; and an additive, the content of the self-emulsifiable polyisocyanate mixture being 0.5 to 100 parts by weight per 100 parts by weight of the water-soluble resin, the solid content of the aqueous emulsion or a total weight thereof.

15. An aqueous dispersion for use as a paint which comprises the self-emulsifiable polyisocyanate mixture according to claim 1 and water, the content of the self-emulsifiable polyisocyanate mixture being 0.5 to 100 parts by weight per 100 parts by weight of water.

16. An aqueous dispersion for use as a paint which comprises the self-emulsifiable polyisocyanate mixture according to claim 1; water; and an additive, the content of the self-emulsifiable polyisocyanate mixture being 0.5 to 100 parts by weight per 100 parts by weight of water.

17. An aqueous dispersion for use as an adhesive which comprises the self-emulsifiable polyisocyanate mixture according to claim 1 and water, the content of the self-emulsifiable polyisocyanate mixture being 0.5 to 100 parts by weight per 100 parts by weight of water.

18. An aqueous dispersion for use as an adhesive which comprises the self-emulsifiable polyisocyanate mixture according to claim 1; water; and an additive, the content of the self-emulsifiable polyisocyanate mixture being 0.5 to 100 parts by weight per 100 parts by weight of water.

19. An aqueous coating composition which comprises the self-emulsifiable polyisocyanate mixture according to claim 6 and at least one member selected from the group consisting of a water-soluble resin and an aqueous emulsion, the content of the self-emulsifiable polyisocyanate mixture being 0.5 to 100 parts by weight per 100 parts by weight of the water soluble resin, the solid content of the aqueous emulsion or a total weight thereof.

20. An aqueous coating composition which comprises the self-emulsifiable polyisocyanate mixture according to claim 6; at least one member selected from the group consisting of a water-soluble resin and an aqueous emulsion; and an additive, the content of the self-emulsifiable polyisocyanate mixture being 0.5 to 100 parts by weight per 100 parts by weight of the water soluble resin, the solid content of the aqueous emulsion or a total weight thereof.

21. An aqueous adhesive composition which comprises the self-emulsifiable polyisocyanate mixture according to claim 6 and at least one member selected from the group consisting of a water-soluble resin and an aqueous emulsion, the content of the self-emulsifiable polyisocyanate mixture being 0.5 to 100 parts by weight per 100 parts by weight of the water-soluble resin, the solid content of the aqueous emulsion or a total weight thereof.

22. An aqueous adhesive composition which comprises the self-emulsifiable polyisocyanate mixture according to claim 6; at least one member selected from the group consisting of a water-soluble resin and an aqueous emulsion; and an additive, the content of the self-emulsifiable polyisocyanate mixture being 0.5 to 100 parts by weight per 100 parts by weight of the water-soluble resin, the solid content of the aqueous emulsion or a total weight thereof.

23. An aqueous dispersion for use as a paint which comprises the self-emulsifiable polyisocyanate mixture according to claim 6 and water, the content of the self-emulsifiable polyisocyanate mixture being 0.5 to 100 parts by weight per 100 parts by weight of water.

24. An aqueous dispersion for use as a paint which comprises the self-emulsifiable polyisocyanate mixture according to claim 6; water; and an additive, the content of the self-emulsifiable polyisocyanate mixture being 0.5 to 100 parts by weight per 100 parts by weight of water.

25. An aqueous dispersion for use as an adhesive which comprises the self-emulsifiable polyisocyanate mixture according to claim 6 and water, the content of the self-emulsifiable polyisocyanate mixture being 0.5 to 100 parts by weight per 100 parts by weight of water.

26. An aqueous dispersion for use as an adhesive which comprises the self-emulsifiable polyisocyanate mixture according to claim 6; water; and an additive, the content of the self-emulsifiable polyisocyanate mixture being 0.5 to 100 parts by weight per 100 parts by weight of water.

* * * * *